G. P. STANLEY.
COMBINATION KNIFE FOR CUTTING TOOTHPICKS.
APPLICATION FILED MAR. 22, 1911.

1,038,798.

Patented Sept. 17, 1912.

Witnesses:
Edward Maxwell
Phineas Keith

Inventor:
George P. Stanley,
by Geo. S. Maxwell,
Attorney.

COLUMBIA PLANOGRAPH CO., WASHINGTON, D. C.

UNITED STATES PATENT OFFICE.

GEORGE P. STANLEY, OF DIXFIELD, MAINE, ASSIGNOR TO DIXFIELD TOOTHPICK CO., OF DIXFIELD, MAINE.

COMBINATION-KNIFE FOR CUTTING TOOTHPICKS.

1,038,798. Specification of Letters Patent. Patented Sept. 17, 1912.

Application filed March 22, 1911. Serial No. 616,223.

*To all whom it may concern:*

Be it known that I, GEORGE P. STANLEY, a citizen of the United States, and resident of Dixfield, in the county of Oxford and State of Maine, have invented an Improvement in Combination-Knives for Cutting Toothpicks, of which the following description, in connection with the accompanying drawings, is a specification, like letters on the drawings representing like parts.

My invention is a die or shaping knife for a machine for making tooth-picks or splint-like articles of the same general character, and has for its object a construction capable of adjustment for extreme accuracy or register in connection with an automatic machine and preferably having provision for changing the angle or taper slightly, means for accurately alining the edges of the four cutting devices into one and the same plane, and a cutter capable of economizing the material being cut, so that it is practicable to use a narrow strip of the wood.

A further feature of my invention resides in having the entire cutter or die united in one body or article of manufacture so that it may be mounted as a whole in the machine, adjusted as a whole, etc.

Furthermore, I regard it as new to adjust the end cutters, whether independently of each other or not, with relation to the longitudinal cutters, and new to provide in the cutting die itself means for varying the length of the tooth-pick being manufactured. Also by having each cutting part made in a separately removable piece or block, the die is much more readily repaired and the parts replaced in case of breakage.

The constructional features of my invention and further advantages thereof will be more fully pointed out in the course of the following description, taken with reference to the accompanying drawings, in which I have shown a preferred embodiment of the invention, and the latter will be more particularly defined in the claims appended hereto.

Figure 1:
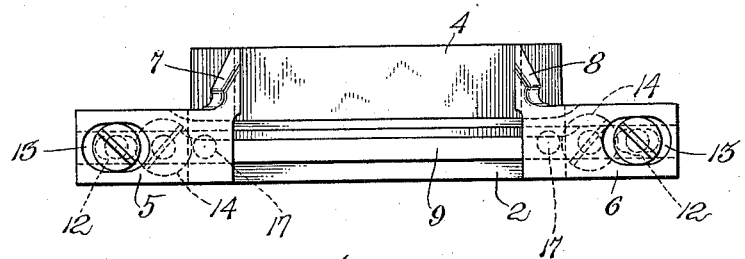
Figure 2:
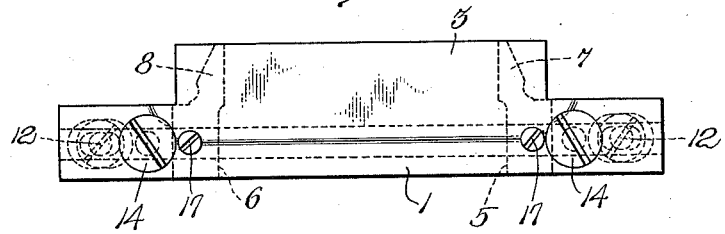
Figure 3:
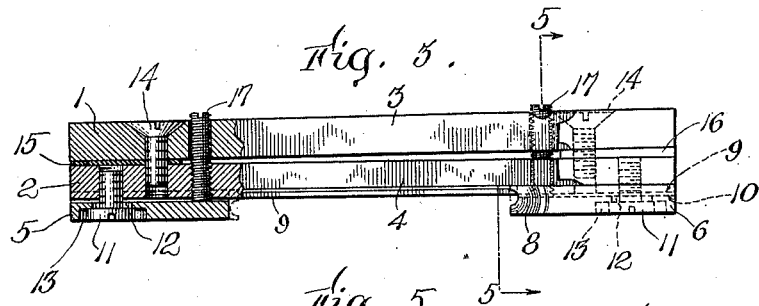
Figure 4:
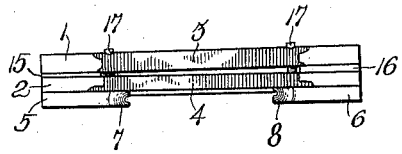
Figure 5:
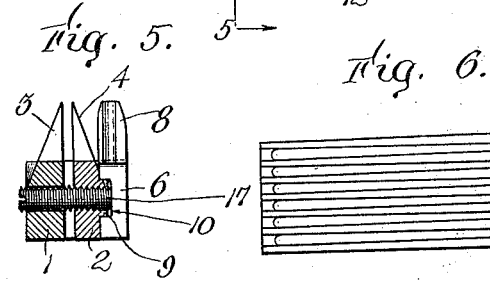

In the drawings, Figure 1 is a view of the die in front elevation, as the same would appear in looking from the in-going end of the machine toward the outgoing end thereof; Fig. 2 is a view thereof in rear elevation; Fig. 3 is a top plan view partially broken away to show the adjusting means more fully; Fig. 4 is a top plan view of the die as it appears in the machine; Fig. 5 is a vertical cross-sectional view on the dotted line 5—5, Fig. 3; and Fig. 6 is a portion of the splint or strip of wood indicating the manner in which the same is cut by the die in accordance with my invention.

The die or composite knife block or cutting head is composed of two main knife bars 1, 2 provided with straight-edge knives 3, 4 respectively, shown as extending integrally upward from, and therefore constituting a part of, said knife bars, said knives having approximately parallel vertical walls on their contiguous sides and obliquely divergent outer walls, as best shown in Fig. 5, and auxiliary end-knife bars 5, 6 provided with end cutters 7, 8 respectively, these end cutters having their adjacent faces vertical and grooved and their outer faces oblique and rounded. Suitable guiding means of any convenient kind is preferably provided for automatically alining and directing the auxiliary end cutters or knives, such means being herein shown as comprising a guideway 9 and slot 10, formed to interlock lengthwise of the block, the former being preferably on the bar 2 and the latter on the end-knife bar. These end-knife bars 5, 6 are secured to the block by any suitable means, preferably adjustably, headed screws 11 being herein shown for that purpose threaded into the longitudinal knife bar 2 and passing through elongated slots 12 in the short end-knife bars, the heads being seated in countersinks 13. The two long knife bars 1, 2 are clamped together by any suitable means as by screws 14 and are held angularly with relation to each other by wedge pieces or blocks 15, 16 or any other suitable means whereby the accurate positioning of the blades 3, 4 is secured with that extreme nicety of position and adjustment requisite for the cutting of the toothpicks in the manner required in this class of machines. One of the objects of having the end cutters 7, 8 independent of each other is to permit their relative angle to be changed slightly with relation to each other, and for this purpose I provide adjusting means, herein shown as consisting of screws 17 threaded into the bars 2 from the back side of the block so as to abut against the end-knife bars 5, 6 and thereby control their position out or in with relation to said bar 2. By this means, their angularity with relation to each other and to the bars 3, 4 is controlled with extreme accuracy.

The construction thus far described permits all the cutters, i. e. the two longitudinal cutters 3, 4 and the two end cutters 7, 8 which constitute the cutterhead or die-block, to be all together in one body, which I consider not only new but of great practical advantage. Because of this construction it is possible to adjust the cutters with relation to each other with the utmost precision so that they will maintain that adjustment notwithstanding that the block or die as a whole may be shifted in the machine. The adjustment of the different cutters with relation to each other is accomplished before the block or die is put into the machine, and then the block as a whole is properly adjusted and secured in the machine. This promotes the accuracy of the machine and tends to facilitate the economy of stock.

Figure 6:
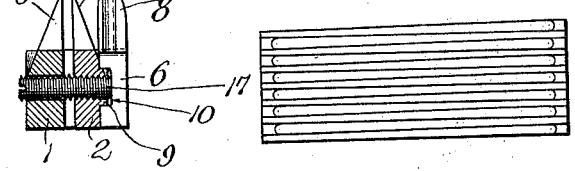

In Fig. 6 I have indicated the manner of making the cuts in the wood with my die or composite cutting tool, from which it will be evident that my cutter makes it feasible to use an unusually narrow strip of wood, inasmuch as practically the entire strip is utilized. Also, by having the end cutters 7, 8 made independent of each other, the length of the tooth-pick may be varied by adjusting said end cutters or knives toward or from each other. I consider it new to adjust the end cutters or knives, whether independently or not. By having them independent of each other, not only can their angle and relative position be changed, but in case one breaks, it is extremely easy to replace the same. This applies also to the entire arrangement inasmuch as, each blade being carried by a separate piece, the breakage or injury of any one blade does not necessitate the discarding of the entire block, but only of that one blade. Also, by having the blades separate, they can be relatively adjusted so that each will register accurately with the others and permit all four cutting surfaces to be brought absolutely even, i. e. into one and the same horizontal cutting plane. In practice the die is set in the machine so that the end cutters or knives 7, 8 are nearer the operator, i. e. the work is fed from left to right, Fig. 5, the die being used in any usual machine, such, for instance, as the machine shown in Patent No. 963,141 of July 5, 1910.

As already explained, it will be understood that my invention is not restricted to the specific details of the preferred embodiment herein contained, as a wide range of changes in form, construction and relation of parts may be made within the spirit and scope of the broader of my appended claims.

Having described my invention, what I claim as new and desire to secure by Letters Patent is:

1. A cutter die for making tooth picks or the like, comprising longitudinal slicing means for cutting the body length of the tooth picks, end cutting means, means for preventing relative displacement of the end cutting means and longitudinal slicing means from operative thrusts, said means consisting in an abutment projecting from one of said means transversely of the direction of cutting movement, the other of said means being provided with a recess for receiving said abutment, and means for rigidly clamping said end cutting and longitudinal slicing means together with the end cutting means adjustably spaced laterally from said slicing means.

2. A cutter die for making tooth picks or the like, comprising longitudinal slicing means for cutting the body length of the tooth picks, end cutting means, and means for rigidly clamping said end cutting means to said longitudinal slicing means in different positions of lateral adjustment relative to said slicing means.

3. A cutter die for making tooth picks or the like, comprising a pair of longitudinal slicing cutters, and end cutters, said slicing and end cutters being rigidly clamped together and said end cutters having provision for adjustable lateral spacing from the cutting edges of said slicing cutters.

4. A cutter die for making tooth picks or the like, comprising longitudinal slicing means for cutting the body length of the tooth picks, end forming and cut-off means, connections for holding the latter means rigid with said slicing means, and means coöperative therewith for positioning the cut-off means in different positions of transverse lateral adjustment relative to the slicing means while preserving the rigid connection between the parts.

5. A cutter die for making tooth picks or the like, comprising longitudinal cutting means for cutting the body length of the tooth picks, end cut-off means, and means for rigidly clamping said cut-off means in rigid interlocking relation to said slicing means in different positions of angular adjustment transversely of said slicing means.

6. A cutter die for making tooth picks or the like, comprising longitudinal cutting means for cutting the body length of the tooth picks, end cut-off means rigidly mounted in interlocking relation to said slicing means, and adjustable spacing screws passing transversely through said slicing means to determine the position of the angular adjustment of said end cut-off means when clamped.

7. A cutter die for making tooth picks or the like, comprising longitudinal slicing cutters rigidly clamped together, opposite end forming and cut-off cutters with means for rigidly clamping them to the slicing cutters, and means coöperative with said clamping means for permitting both lengthwise and transverse lateral adjustment of the cut-off cutters relative to the slicing cutters, said means presenting a transverse abutment in all positions of adjustment of the cut-off cutters to resist displacement thereof from operative thrusts.

8. A cutter die for making tooth picks or the like, comprising longitudinal slicing cutters rigidly clamped together, opposite end forming and cut-off cutters, means for clamping said end cutters rigidly in interlocking relation to said slicing cutters, said means being formed to permit endwise adjustment of said end cutters, and means for varying the angular adjustment of the end cutters transversely of the slicing cutters.

In testimony whereof, I have signed my name to this specification, in the presence of two subscribing witnesses.

GEORGE P. STANLEY.

Witnesses:
WINTHROP L. GUILD,
JOHN M. HOLLAND.

---

Copies of this patent may be obtained for five cents each, by addressing the "Commissioner of Patents, Washington, D. C."